Figure 13:
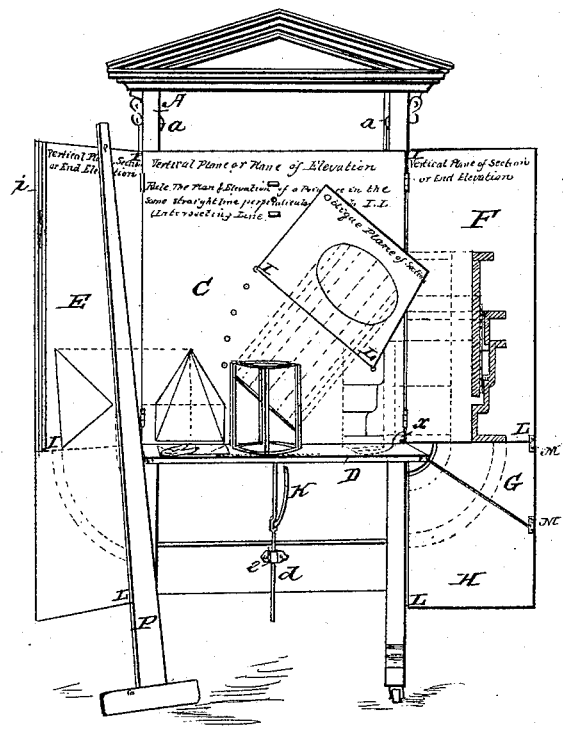

(No Model.) 4 Sheets—Sheet 1.
J. M. PRINGLE.
GEOMETRICAL DRAWING BOARD.
No. 390,397. Patented Oct. 2, 1888.
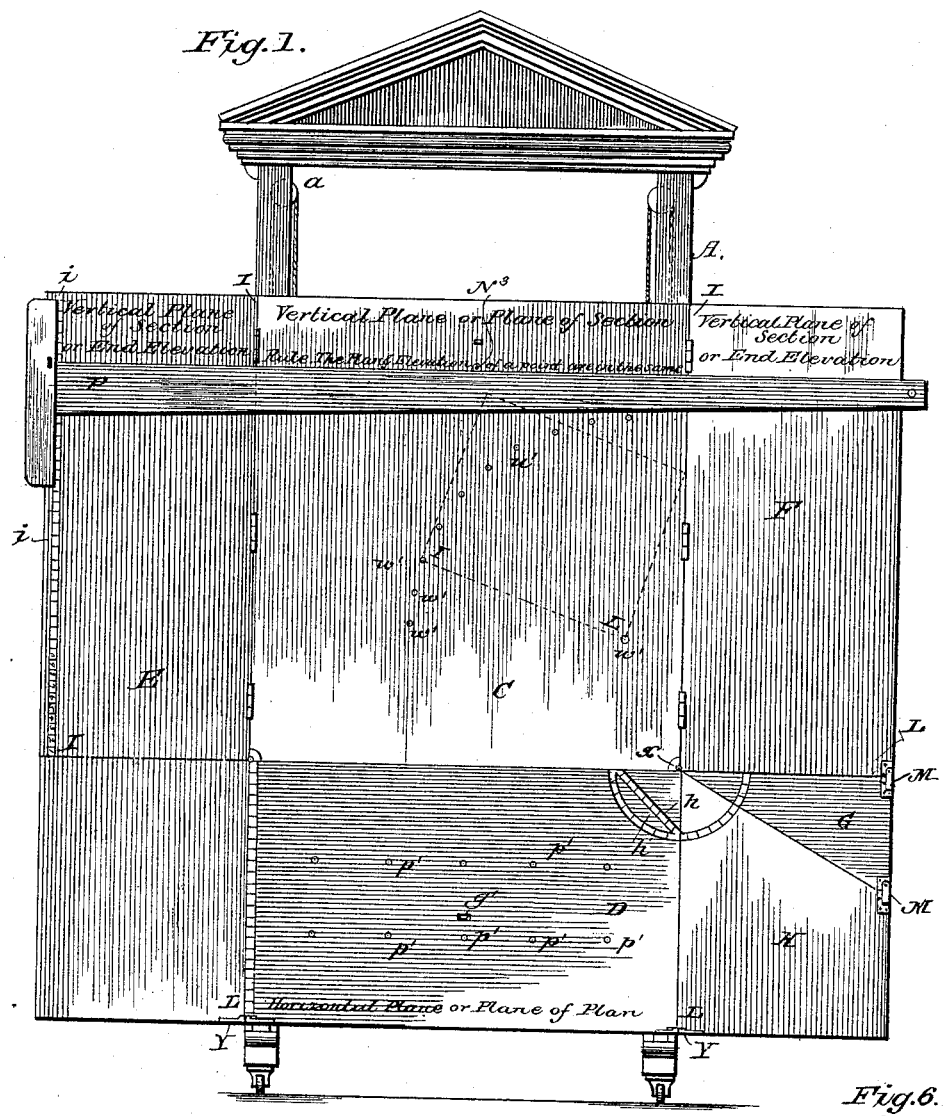
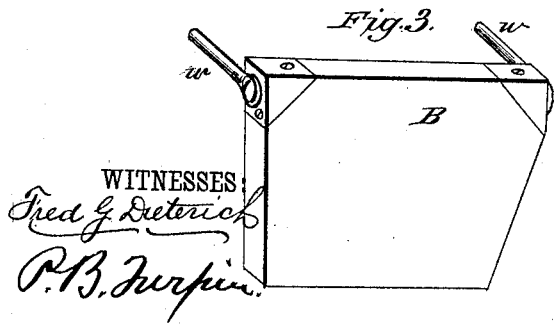
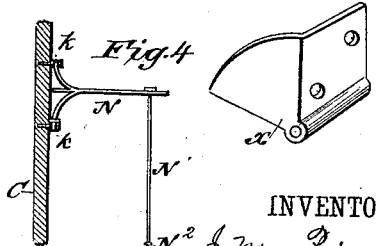
WITNESSES:
Fred G. Dieterich
P. B. Turpin
INVENTOR:
J. M. Pringle
BY Munn & Co
ATTORNEYS.

(No Model.) 4 Sheets—Sheet 2.
J. M. PRINGLE.
GEOMETRICAL DRAWING BOARD.
No. 390,397. Patented Oct. 2, 1888.
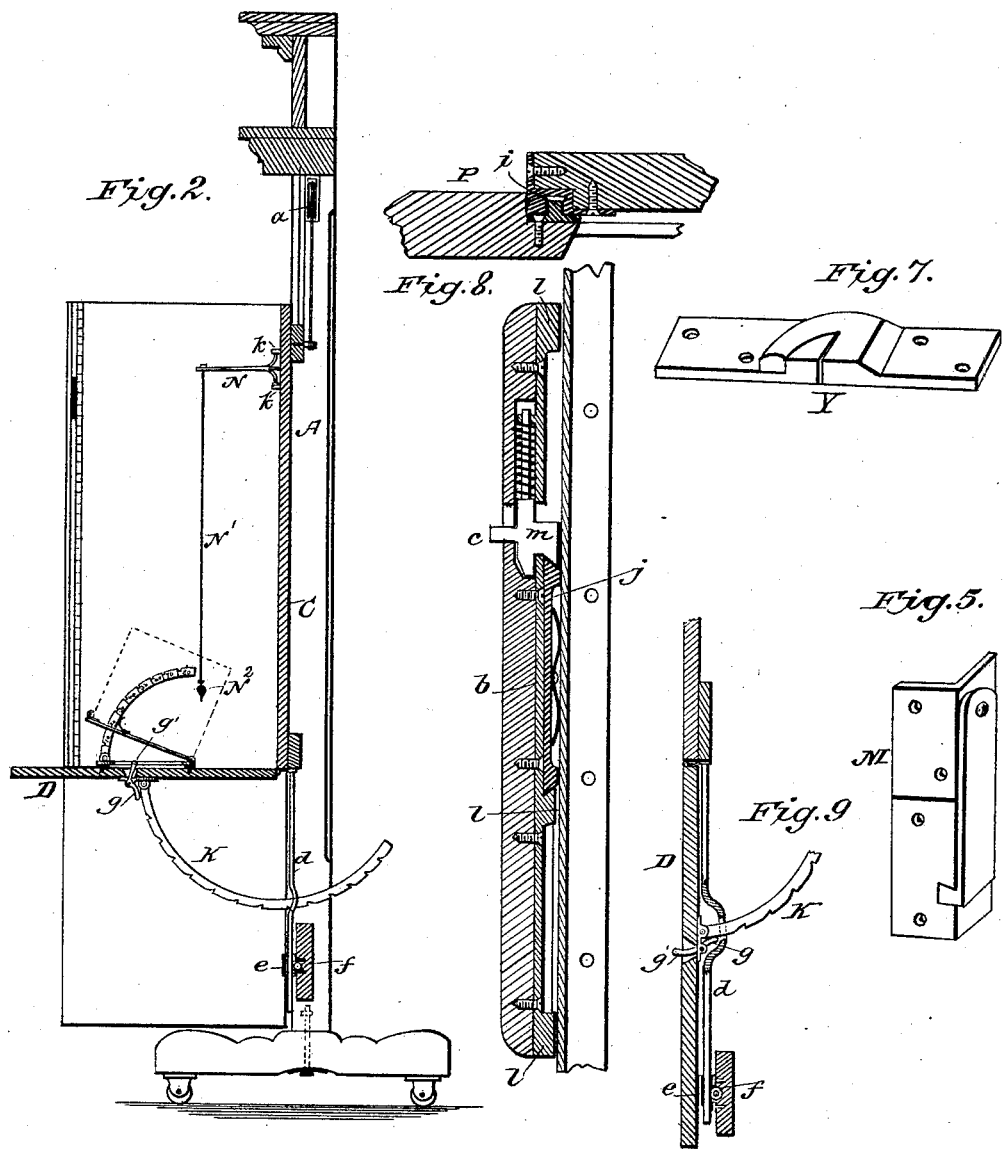
WITNESSES:
Fred G. Dieterich
P. B. Turpin.
INVENTOR:
J. M. Pringle
BY Munn & Co
ATTORNEYS.

(No Model.) 4 Sheets—Sheet 3.
J. M. PRINGLE.
GEOMETRICAL DRAWING BOARD.
No. 390,397. Patented Oct. 2, 1888.
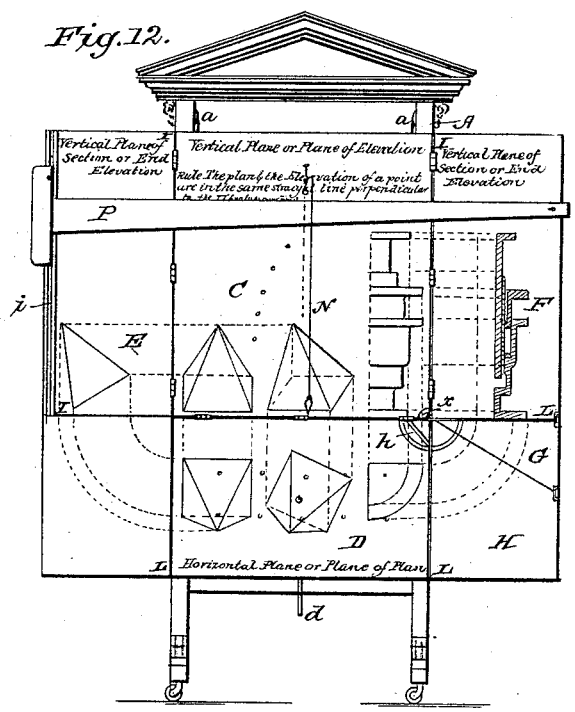
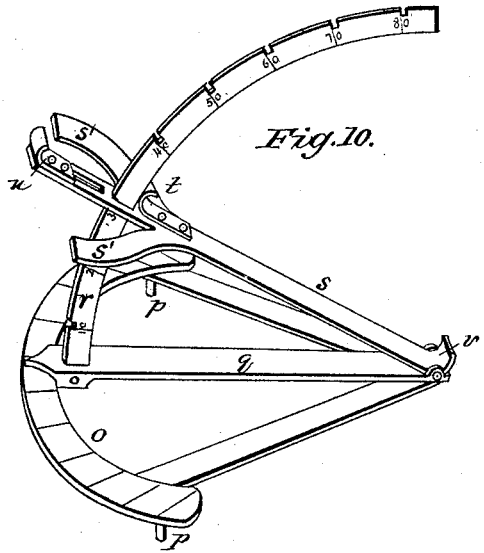

(No Model.) 4 Sheets—Sheet 4.

J. M. PRINGLE.
GEOMETRICAL DRAWING BOARD.

No. 390,397. Patented Oct. 2, 1888.

WITNESSES:
Fred G. Dieterich
P. B. Turpin

INVENTOR:
J. M. Pringle
BY Munn & Co
ATTORNEYS.

N. PETERS, Photo-Lithographer, Washington, D. C.

UNITED STATES PATENT OFFICE.

JAMES MILNE PRINGLE, OF BATHURST, NEW SOUTH WALES.

GEOMETRICAL DRAWING-BOARD.

SPECIFICATION forming part of Letters Patent No. 390,397, dated October 2, 1888.

Application filed February 9, 1888. Serial No. 263,482. (No model.) Patented in New South Wales October 1, 1885, No. 1,699, and in England October 3, 1885, No. 11,785.

*To all whom it may concern:*

Be it known that I, JAMES MILNE PRINGLE, a subject of the Queen of Great Britain, residing in the city of Bathurst and Colony of New South Wales, Australia, have invented a new and useful Improvement in Geometrical Drawing-Boards, (for which I have obtained Letters of Registration in New South Wales, No. 1,699, bearing date October 1, 1885, and also a patent in England, No. 11,785, and bearing date October, 3, 1885,) of which the following is a specification.

The invention has for an object to provide simple means for facilitating the teaching and explaining of the principles of that branch of solid or descriptive geometry used in the constructive arts—viz., geometrical projection—and also for the purpose of simplifying and practically illustrating these principles in the teaching of mechanical drawing, first, by the placing of models on the plane of plan and determining from observation or by measurement their plans, elevations, and sections; second, by turning the different planes into one vertical plane, when the drawing and the method of determining its projections will appear on the board, as on an ordinary drawing on paper, and also to practically illustrate, first, the determination of oblique lines and planes in geometrical and perspective drawing; second, the use of plans, elevations, and sections in architectural and mechanical drawing; third, different views of the same object in model-drawing and for the ordinary uses of a blackboard.

The board, which is made of wood, is fixed to an upright frame of wood or iron, and is composed of various planes hinged together and arranged in a certain way. One portion forms a plane of plan or horizontal plane on this plane wire, or other models of the objects to be drawn can be placed and held at any angle to the horizontal or vertical plane, or to both, by means of a double quadrant having two movable arms. The projections of the various points and lines in the model can then be determined and clearly demonstrated from observation on the planes of plan, elevation, and section, after which the different planes, being turned into one vertical plane corresponding with the one plane used by the student, show the drawing and the method of determining its projections exactly as they appear on the paper. The student has thus the advantage of seeing the object to be drawn and of observing its position with reference to the planes of plan, elevation, and section, and he is also able to perceive how the object corresponds, line by line and point by point, with its plan, elevation, and section, and why these projections have a certain appearance. The board is also fitted with a plane to receive oblique sections, a hinged pointed wire and plummet to illustrate the reason of the rule used in geometrical projection—viz., that the plan and the elevation of a point are in the same straight line perpendicular to the I. L. ("intersecting-line,") an adjustable T-square, a scale of chords, a quadrant, and a scale graduated with inches eighths and tenths.

When not in use, the board may be closed and locked.

The invention consists in certain features of construction and novel combinations of parts, as will be hereinafter described and claimed.

Figure 11:
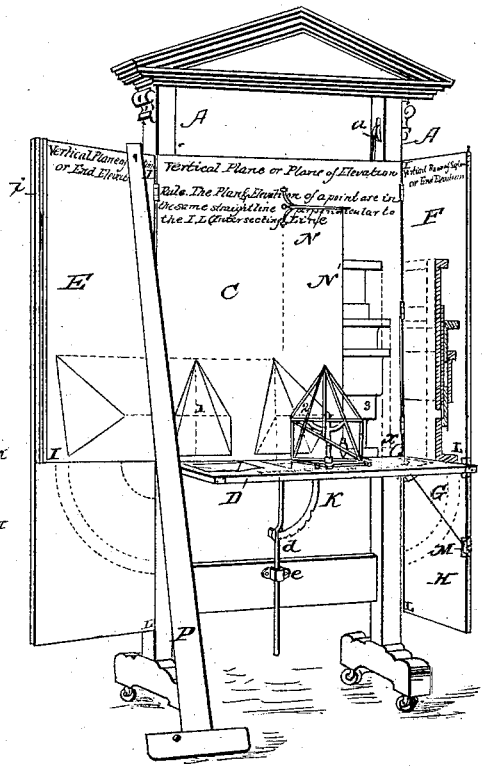
Figure 14:
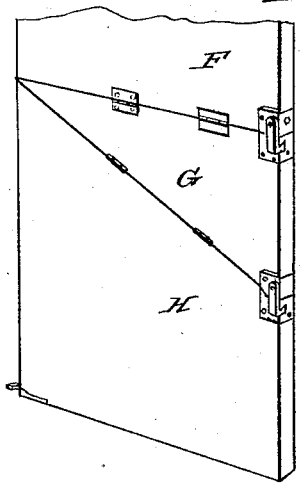

In the accompanying drawings, Figure 1 is a front view of the whole board when the different boards form one plane surface. Fig. 2 is a vertical section when one plane is horizontal and another at right angles to the vertical plane. The double quadrant is shown supporting a wire model of a cube which is parallel to the vertical plane and makes angles of thirty and sixty degrees with the horizontal plane. Fig. 3 is a detail view of an oblique section plane which can be attached to the vertical plane. Fig. 4 is a detail view of a pointed wire, which can be attached to the board, and from which is suspended a plummet for the purpose of illustrating the rule which governs geometrical projection. Fig. 5 is a detail view of a dovetail catch riveted to an angle-plate and screwed to edge of board (see Fig. 1) for the purpose of keeping it rigid. Fig. 6 is a detail view of a corner-plate fixed to lower corners of vertical plane and having a small hole for a wooden pin to receive the point of compasses. Fig. 7 is a detail view of flush-hook fixed to Fig. 1 at *y* for the purpose of keeping the adjoining planes flush on the face. Fig. 8 shows in detail the construction whereby the T-square is connected to the board and holding the same in any suitable adjustment. Fig. 9 is a detail view of the quadrant and keeper which supports the horizontal plane. Fig. 10 shows in detail the double quadrant with movable arms and rest to support wire models of solids when they make an angle with the horizontal or vertical plane, or with both. Figs. 11, 12, and 13 are views of the apparatus, illustrating the same as when in use; and Fig. 14 represents the hinge of the sections in detail.

Similar letters refer to similar parts throughout the several views.

The board is mounted on a vertical frame, A, to which it can either be fixed when small by means of screws, or suspended when large by means of weights, cords, and pulleys $a$.

C, Fig. 1, is the main section forming the vertical plane or plane of elevation, the words "Vertical Plane or Plane of Elevation" being printed permanently on the plane C. To the lower edge of the section C is hinged the section D, forming the horizontal plane or plane of plan, the words "Horizontal Plane or Plane of Plan" being printed permanently on the plane D, which can be raised or lowered to make any angle with section C, and secured thereat by means of a notched quadrant, K, Figs. 2 and 9, passing through a slot in an iron bar, $d$, which is screwed at its upper end to the edge of section C, the lower end passing through a keeper, $e$, fastened to cross-rail of frame A. A small flush roller, $f$, keeps the friction of bar $d$ off the rail. A latch, $g$, operates to lift the quadrant out of the notch when required, the latch having a thumb or handle portion, $g'$, projecting through the face of the horizontal plane section.

To the left vertical edge of section C is hinged the section E, which forms a vertical plane of section or end elevation, the words "Vertical Plane of Section or End Elevation" being printed permanently on the plane E. To the right vertical edge of section C is hinged the section F. To F is hinged a supplemental section, G. To G is hinged a section, H, all these sections F, G, and H forming one vertical plane corresponding to plane E, and having the words "Vertical Plane of Section or End Elevation" also printed permanently upon it. The plane is kept rigid by means of dovetail catches M, Figs. 1 and 5. A graduated quadrant, $h$, of brass or other metal, is cut into three parts. One part, $h'$, having a scale of chords attached, is inserted into the plane D, and also into the sections G and H, to determine, first, the angle which section D makes with section C, and, second, the angle which section F makes with section C when sections G and H are turned up behind section F and section D is at right angles to section C.

Two brass or other metal eyes, $k$ $k$, Figs. 1, 2, and 4, are screwed into the vertical plane C. A pointed wire, N, Fig. 4, with two branches turning up and down, the lower branch having a small shoulder, is inserted into the eyes $k$ $k$. To the end of N, passing through a small hole, is attached a cord, N', to which is suspended a small plummet, N². The purpose of the wire and plummet is (the wire being considered a horizontal and the cord a vertical ray of light) to practically illustrate the rule in geometrical projection that the plan and the elevation of a point are in the same straight line perpendicular to the I. L., (intersecting line,) the rule being printed permanently on the board on either side of the point O N³, Fig. 1, from which a chalk-line can at any time be drawn to the plan of the point on the horizontal plane which is determined by the plummet.

The intersecting lines and the letters "I. L.," Figs. 1 and 13, and the words "Oblique Section Plane," are also painted permanently on the boards. A flush-hook, Y, Fig. 7, is screwed to the lower edges of planes D and F at $y$ for the purpose of keeping these boards flush on the face. A T-square, P, Figs. 1 and 8, is attached to the board by means of an angle-plate, $i$, made of brass or other metal, and fixed to the edge of the board. In the plate is a dovetailed groove, in which works a slide, $j$, with a spring at back to keep it in position. To the stock of the T-square is fixed a plate, $b$ $b$, having square projections $l$ $l$ $l$, to work in the groove of angle-plate. A loose tongue, $m$, Fig. 8, is inserted in the wood stock of square behind the plate $b$ $b$ and working on a spiral spring and pin which passes through a projection of the plate $b$ $b$. The tongue may be pressed up by a horizontal pin, $c$, which projects beyond the outside of the wood stock, and the tongue $m$, projecting through the plate $b$ $b$, and engaging on the upper side of slide $j$, and co-operating with the beveled projection L below said slide, serves to hold the square in position and to permit its ready application and removal when so desired.

A double quadrant, Fig. 10, made of brass or other metal, is provided to hold the wire models of solids in position when the same make an angle with the horizontal plane. The horizontal quadrant $o$ $o$ has two small pins, $p$ $p$, at angles, which, being inserted into corresponding socket-holes, $p'$ $p'$, in the horizontal plane, Fig. 1, keep one side of the quadrant parallel to the vertical plane. The lower arm, $q$, is attached to the center or angle of quadrant by a pivot. The upper arm, $s$, is hinged at one end to the lower arm, and has a slot near the free end, through which passes a vertical graduated quadrant, $r$, notched every ten degrees. A spring, $t$, presses the quadrant into the notch, which holds the upper arm at the required angle. The lower end of the vertical quadrant is hinged to the free end of the lower arm, which, rotating on the pivot, moves on the face of the horizontal quadrant, and thus makes any desired angle with the vertical plane. Again, the upper arm, $s$, moving on the vertical quadrant, makes any angle with the horizontal plane. Upon the upper arm, which is branched at *s'*, is placed the wire model of the object to be drawn, which is kept in position by means of a rest, *v*, at the lower end, and a sliding hook, *u*, at the other end. A corner plate or plates, *x*, Figs. 1 and 6, has a wooden pin, *x'*, to receive point of compasses. An oblique section plane, B, Fig. 3, and as indicated on Fig. 1, can be attached to the vertical plane by means of loose eye-pins *w w*, inserted into corresponding socket-holes, *w' w'*, Fig. 1, one of said sockets forming a center and the others being arranged in an arc and spaced every ten degrees.
In Fig. 11 I have shown the wire model of a pyramid together with two projections, one being with one side of the base parallel to the vertical plane and the base, making an angle of thirty degrees with the horizontal plane, the other having the base still making an angle of thirty degrees with the horizontal plane, and the side of the base making thirty degrees with the vertical plane.

In Fig. 12 the projections are shown as they would appear on the paper of the student. Said Fig. 12 also shows one-half elevation and one-half section of an expansion joint. This figure also shows the wire and the plummet suspended therefrom.
Fig. 13 shows on the horizontal or base section a wire model of a cylinder standing on its plan and in front of its elevation. Such figure also illustrates the use of oblique section plane. The lower edge of the plane, which forms the intersecting line, is fixed at an angle similar to that made by the required section with the horizontal plane. The oblique plane, being then turned round so as to be at right angles to the vertical plane, is then parallel to the oblique section in this case of a cylinder whose projection it receives.

It will be seen from the drawings and foregoing description that the drawing-board in its various combinations and arrangements of planes and quadrants greatly simplifies and practically illustrates the principles of orthographic or geometrical projection used in mechanical drawing, first, by the use of planes of plan elevation and section *a* in their normal position—that is, parallel to their respective projections *b*—by turning the different planes into one vertical plane to correspond with the drawing on the paper of the pupil; second, by the placing of wire or other models of geometrical solids and objects on the horizontal plane, and when required holding the same at any angle to the vertical and horizontal planes, or to both, by means of a double quadrant, when the projections of the model can be demonstrated line by line and point by point, either from observation or by measurement; third, by the use of a hinged wire from which is suspended a plummet (the wire representing a horizontal and the cord and plummet a vertical ray of light) to demonstrate the rule in geometrical projection—viz., "the plan and the elevation of a point are in the same straight line perpendicular to the intersecting line;" fourth, by the painting permanently on the board the rule, the intersecting lines, and the name of the different planes, all as set forth in the foregoing specification.

I am not aware that prior to my invention a drawing-board such as I describe has been made.

What I therefore claim, and desire to secure by Letters Patent, is—

1. A board adapted to facilitate the teaching and explaining of solid or descriptive geometry, comprising a main section and a hinged or pivoted plane section or sections, such sections being adjustable relatively, substantially as described, whereby the drawing-faces of such sections may be adjusted parallel to different planes or elevations of the same object or model and into a common plane, substantially as set forth.

2. In a board substantially as described, the combination, with a main section, of the hinged side section or sections and the hinged horizontal plane section, all arranged substantially as described, and for the purpose specified.

3. The combination of the main section, the hinged side section, the hinged horizontal plane section, and the model-support, substantially as set forth.

4. In an apparatus substantially as described, a model-support consisting of a horizontal quadrant, a lower arm pivoted at one end to the quadrant, the upper arm hinged at one end to the lower arm at the pivoted end thereof and having a slot near its upper or free end, and the notched quadrant secured to the lower arm and extended through the slot in the upper arm, substantially as set forth.

5. In an apparatus substantially as described, the combination of the main section, the horizontal section hinged and having socket-holes *p'*, the model-support having its base or horizontal quadrant provided with pins *p* to engage said socket-holes, and the hinged side section or sections, substantially as set forth.

6. In an apparatus substantially as described, the combination of several sections hinged together, whereby they may be adjusted to different relative angles and the graduated scales on such sections, whereby the angles thereof may be accurately determined, substantially as set forth.

7. In an apparatus substantially as described, a main section and a horizontal plane section adjustable to different angles relative to the main section, combined with a model-support mounted on said horizontal plane section and provided with clamps for securing a model, substantially as set forth.

8. In an apparatus substantially as described, the combination, with a main section, of a horizontal plane section hinged at its upper edge to such main section, whereby it may be set at various angles thereto, and a side section hinged at one side edge to the main section and movable over the horizontal plane section in the use of the apparatus, substantially as described, and for the purpose specified.

9. In an apparatus substantially as described, the combination of a main section, a hinged horizontal section, and a hinged side section, the latter being formed of sub sections F, G, and H, hinged together, substantially as described, and for the purpose specified.

10. An apparatus substantially as described, comprising a main section, the side section, E, hinged to one side edge of the main section, the horizontal plane section hinged to the lower edge of the main section, and the side section formed of sub-sections F, G, and H, the section F being hinged to the main section, the section G to the section F, and the section H to the section G, all substantially as and for the purpose specified.

11. In an apparatus substantially as described, the combination of the main section, the horizontal plane section, whereon to support a model, the horizontal wire or arm, and the plummet suspended therefrom and adapted for use substantially as described, and for the purpose specified.

12. In an apparatus substantially as described, the combination of the supporting-frame, the main section movable vertically in said frame, a rod or bar, $d$, depending from said main section and having a slot forming a guide for the quadrant, the horizontal plane-section hinged at its upper end to the main section, and the quadrant connected with the horizontal plane section and extended down and rearwardly through the guide-slot in the bar $d$, substantially as and for the purpose specified.

13. In an apparatus substantially as described, the combination of the main section having a number of sockets, $w'$, one of which forms a center while the others are ranged in an arc struck therefrom, the horizontal plane-section, and the oblique section plane B, having pins $w\,w$ fitted to the sockets $w'$, substantially as set forth.

14. An apparatus substantially as described, having a section or portion provided with a dovetail groove, combined with a spring-actuated slide fitted in said groove, and the T-square having its head provided with a projection, L, for engaging on one end of said slide, and with a spring-actuated tongue for engaging on the opposite end of the slide, substantially as set forth.

15. The improved apparatus, substantially as herein described and shown, consisting of the main section, the horizontal plane section, the side section, E, the side section formed of sub sections F, G, and H, the model support mounted on the horizontal plane section, the arm or wire pivoted at one end to the main section, and the plummet suspended from the said arm or wire, substantially as and for the purposes specified.

JAMES MILNE PRINGLE.

Witnesses:
I. B. BEAUREGARD,
DONALD MCINTOSH.